(No Model.) 2 Sheets—Sheet 1.
E. A. STREET & R. W. FLEMING.
UNDERGROUND CONDUIT FOR ELECTRICAL CONDUCTORS.
No. 331,918. Patented Dec. 8, 1885.
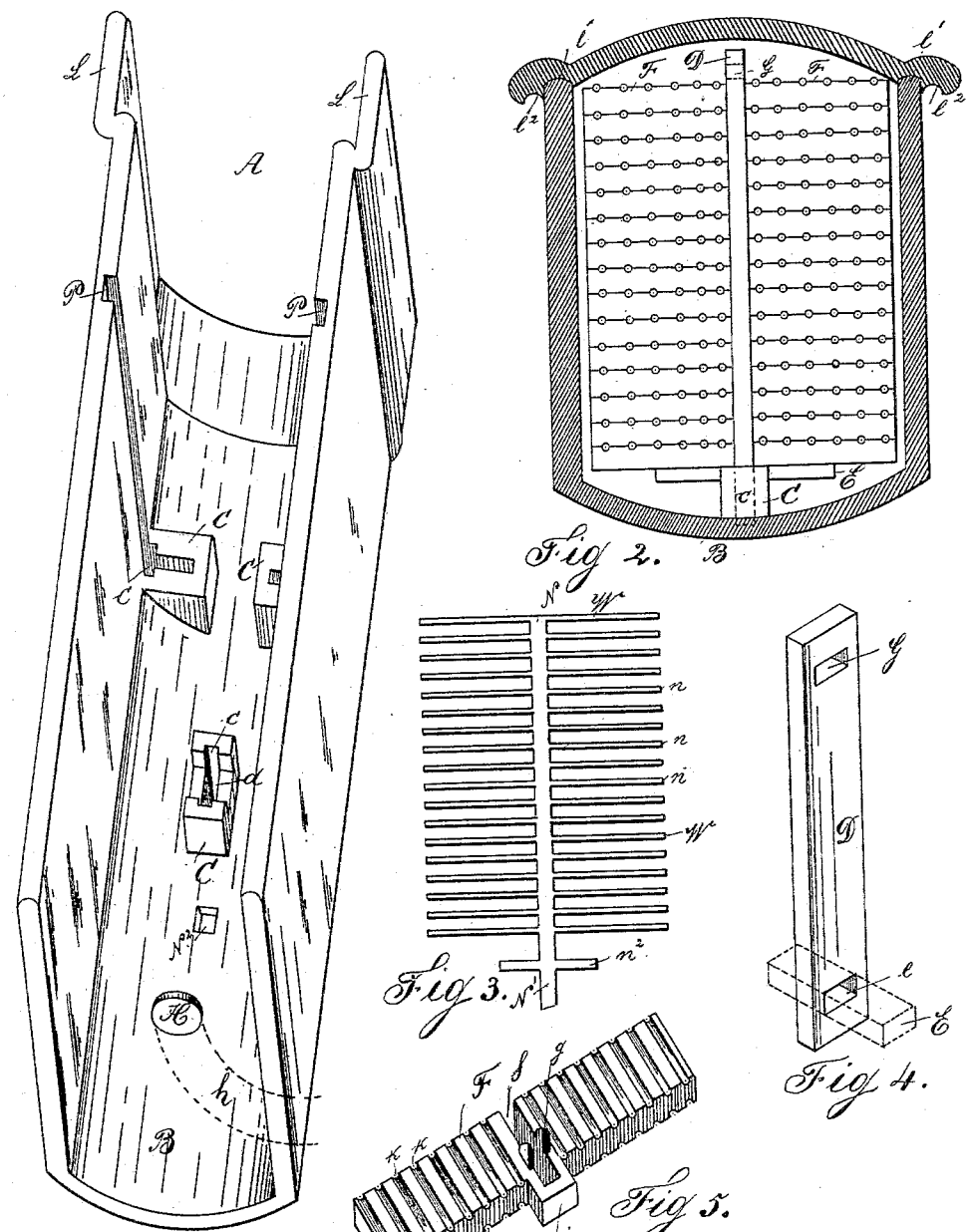
WITNESSES:
Charles Weber.
P. W. Musgrave
INVENTORS
E. A. Street, and
R. W. Fleming
BY J. C. Higdon
ATTORNEY.

(No Model.) 2 Sheets—Sheet 2.
E. A. STREET & R. W. FLEMING.
UNDERGROUND CONDUIT FOR ELECTRICAL CONDUCTORS.
No. 331,918. Patented Dec. 8, 1885.
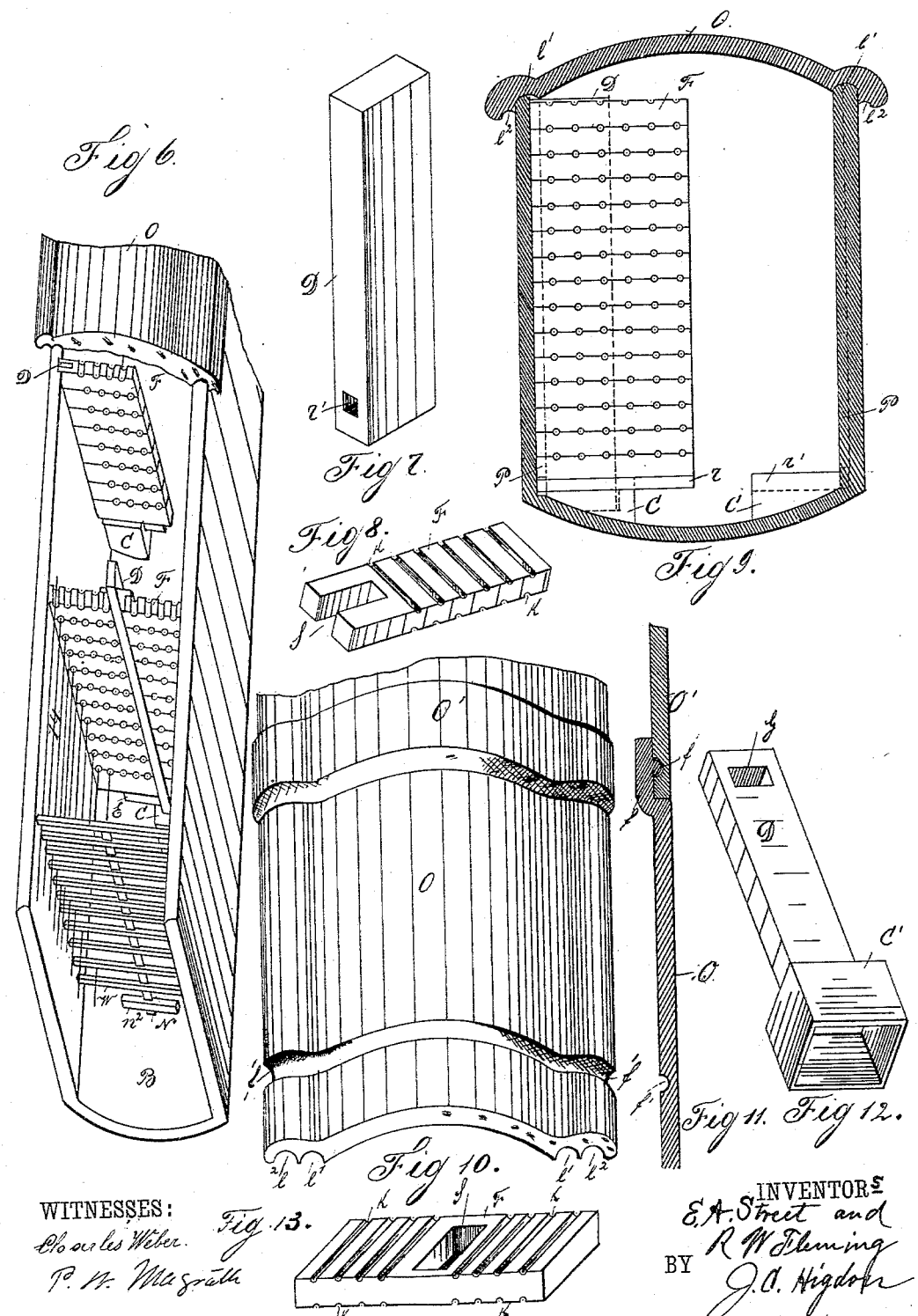
WITNESSES:
INVENTORS
E. A. Street and
R. W. Fleming
BY
J. O. Higdon
ATTORNEY.

UNITED STATES PATENT OFFICE.

EUGENE A. STREET AND RANDALL W. FLEMING, OF KANSAS CITY, MO.

UNDERGROUND CONDUIT FOR ELECTRICAL CONDUCTORS.

SPECIFICATION forming part of Letters Patent No. 331,918, dated December 8, 1885.

Application filed October 27, 1884. Serial No. 146,578. (No model.)

*To all whom it may concern:*

Be it known that we, EUGENE A. STREET and RANDALL W. FLEMING, of Kansas City, Jackson county, Missouri, have invented certain new and useful Improvements in Underground Conduits for Electrical Conductors, of which the following is a full, clear, and exact description.

Our invention relates to improvements in underground conduits for holding electrical conductors; and the objects of our improvements are, first, to provide underground conduits with an improved continuous and connected cover, detachable in sections, that will not need the coupling-joints thereof to be cemented to keep water and dirt out of the conduit; second, to provide underground conduits with an apparatus for holding therein electrical conductors separate and apart from one another, which may stand away from the walls of the conduit-trough or be used in connection with them, and whose parts shall be detachable from one another, and from which electrical conductors can be separated without separating them from any of the others; third, to provide underground conduits with a means for reducing the quantity and power of the induction generated in such conduits by a lot of electrical conductors placed therein.

Reference is to be had to the accompanying drawings, forming part of this specification, in which similar letters of reference indicate corresponding parts.

Figure 1 is a perspective view of the conduit-trough for holding electrical conductors, (with its cover removed.) Fig. 2 is a transverse section of a conduit-trough with a cover on and the conductor-supports in position. Fig. 3 is a front elevation of our improved induction-absorber. Fig. 4 is a perspective view of one form of our removable standard. Fig. 5 is a perspective view of a detachable arm or support for holding electrical conductors. Fig. 6 is a perspective view of a complete section of the conduit, having the wire-supporting devices used in position, a portion of the cover being broken away in order to exhibit the same. Fig. 7 is a perspective view of a varied form of removable standard. Fig. 8 represents a varied form of detachable arm or support for holding electrical conductors. Fig. 9 is a repetition of Fig. 2, exhibiting the manner of applying the varied form of wire-supports. Fig. 10 shows a portion of the continuous cover in perspective. Fig. 11 is a longitudinal section of the same, and Fig. 12 is a perspective view of still another form of removable standard. Fig. 13 is a perspective view of a variation in wire-supporting arms.

A designates a trough or casing in which the electrical conductors are placed.

B designates the bottom of the trough. C designates a standing block raised from said bottom. We prefer that it be made integral with the said bottom. It may be located at any suitable place in said bottom and at suitable distances apart. Two or more of them may be placed in a line from wall to wall of the said trough for a series of wire-supporters to rest upon, but said standing block is more especially intended for holding firmly in an upright position a pole or standard (designated by D.) For that purpose the said standing block C may be mortised, as indicated by $c$ in its top face, into which an end of a pole or standard, D, as shown in Figs. 4 and 7, may be inserted; or the pole or standard may have a hood, $c'$, (shown in Fig. 12,) at one end of it to pass over and cover the said standing block. We prefer that the block be mortised.

E designates a detachable pin, and when used passes through a corresponding aperture, $e$, made in one end of the standard D, as shown in Fig. 4, and rests in a corresponding depression, $d$, in said standing block C. The pin E serves the triple purpose of upholding in part all the overlying arms or supports F, with all the electrical conductors thereon, when they are placed in position, as shown in Figs. 2, 6, and 8, also of holding them all together when it is desired to move them from the trough A by one operation, also of aiding to detach from the pole or standard any of the arms or supports F without moving therefrom any of the others.

F designates a detachable arm or support for holding electrical conductors in place. It may have grooves $k$ on its upper and lower faces, in which the conductors rest. Said arms or supports are placed one upon another, as shown in Figs. 2 and 6. They are attached to one another by the lugs $g$, and corresponding recesses, $g'$, made in opposite faces of each, when they are used, and to the standard or pole D, by means of the aperture S and yoke i. Several lugs, g, and recesses g' may be used. We prefer the form of arm or support shown in Fig. 13, without the lugs and recesses.

G is a hand-hole made in one end of a detachable pole or standard, by which the pole may be removed from the trough A, as indicated, or through which a cross-bar (not shown) may pass, extending from wall to wall of the trough, to sustain the pole D when necessary. Standard D is a plain slab. When the forms of supports F shown in Figs. 5 and 13 are used, a space shall be left between their ends and the walls of the trough, that conductors may be placed in or removed from the said trough thereby. When the varied form shown in Fig. 8 is used, a like space shall be left for the same purpose near the center of the said trough. This varied form is used with the varied form of standard shown in Fig. 7, in connection with a standing block, C, placed next the walls of the trough, as shown in Figs. 1, 6, and 9, and with the groove P, (shown in Fig. 1,) into which the recessed part of the arm F aforesaid, Fig. 8, and standard aforesaid are inserted.

H designates a drain-hole in bottom of conduit, and h a drain-pipe.

L designates a flange on conduit-trough to connect with next adjoining section to form a connected and continuous conduit-trough. The joints thus formed are cemented.

O designates a section of cover for said conduit-trough. The longitudinal grooves $e'$ fit the tops of the walls of the same, while the grooves $e^2$ fit the tops of the flanged walls of it, and elsewhere serve as eaves to the walls of said trough, and also as a means by which to lift the sections O of cover off of the trough A, when desired.

O' designates a connecting-flange on one end of each section O of cover, to couple with the next adjoining section of cover, to form a continuous and connected cover.

$f$ designates in Fig. 11 a projection from the under surface of the flange O', to fit a corresponding groove, $f'$, in the upper surface of the next connecting section of cover, that dirt and water may be kept out of the conduit when the coupling-joints of the cover are not cemented. $f$ and $f'$ are located near the ends of each section of cover.

The cover may be of any suitable shape; but we prefer that it be circular, as shown in Figs. 2 and 9.

The several parts aforesaid may be made of anything suitable; but for the objects stated we prefer that they be made of some non-conducting material. Accordingly, we prefer "Dorsett's Compound," being United States Patent No. 244,988, because it is non-conducting, impervious both to water and gases, unaffected either by them or acids or frost, strong, durable, and readily made into suitable shapes.

To reduce the induction, we prefer also to provide an induction-absorber, which is designated by W. (Shown in Fig. 3.) N designates the body of it; $n$, ribs extending from the body N; $n^2$, a prong from the same, but below the ribs $n$. The body N of the absorber below the prong $n^2$ passes through the hole $N^2$ in the bottom of the trough A into the earth beneath. It is placed anywhere in said trough deemed advisable, the ribs $n$ passing horizontally between two layers of electrical conductors. It is made of any metal or combination of metals that is a good conductor of electricity or magnetism, and serves the object of carrying from the conduit into the earth beneath that amount of induction or magnetism always existing among a lot of conductors of electricity, which interferes with the practical use of said conductors.

The said induction-absorber may be of any other suitable form, but should be so constructed that each wire placed within the conduit shall be equally distant from some part of said absorber, that its absorbing power shall act equally on each conductor. It is preferred that the absorber be kept separate and apart from the walls and top of the conduit, and, further, have no contact with the said electrical conductors, thus largely avoiding what is termed "retardation," resulting from contact with earth-lines, in each case, for the purpose stated, as well as for reducing the effect of all other electric disturbances interfering with the practical use of the said underground wires for electrical purposes.

Having fully described our invention, we desire to claim and secure by Letters Patent the following:

1. In an underground conduit for electrical conductors, the combination of a sectional conduit-trough having a coupling-flange at one end of each section, with a sectional cover removable in sections, having a beaded projection from the under surface of said flange and near its end, a groove made in the upper surface of the coupled end of the next section of cover and near its end to fit the aforesaid beaded projection, and two parallel grooves in the under surface of each section of cover at its sides to fit the walls of said trough and to form eaves, all substantially as described.

2. In a conduit for underground electrical conductors, a series of devices detachable in parts, located centrally within it and at suitable distances apart for upholding electrical conductors separate and apart from each other and in separate rows, each device being independent of the sides and top of the conduit, and consisting of a standing block placed centrally upon the bottom of the conduit-trough, a standard attachable thereto in an upright position and detachable therefrom without detaching any other part, and a series of wire-supporting arms lying horizontally and aligned one above the other, having grooves or slots for electrical conductors to rest in, each arm at its center having an opening to embrace said standard, and each one detachable therefrom and from each other without detaching any other one, for the purpose stated, and substantially as described.

3. In a conduit for underground electrical conductors, the combination of a conduit-trough with a standing block raised from the bottom thereof at its center and having a mortise in its top face, with a standard attachable in an upright position thereto by being inserted into said mortise, and with a series of wire-supporting arms lying horizontally and aligned one above the other, each arm having grooves or slots in which electrical conductors shall rest, and having at its center an opening to embrace and be detachable from said standard, and with a series of metallic upright devices placed in said conduit at suitable distances apart, so that each wire placed in said conduit shall be equally distant from said standard, for the purposes stated, and substantially as described.

4. In an underground conduit for electrical conductors, the flanged trough-section A, block C, formed integral therewith, standard D, wire-supports F, and pin E, in combination with removable cover-section O, which latter is provided with an internally-beaded flange at one extremity and an annular groove at the other for engaging the bead of a succeeding section, substantially as and for the purposes herein described.

5. A detachable arm or wire-support having grooves in its faces and an aperture in its center, for the purposes stated, and made of a non-conducting material, substantially as set forth.

EUGENE A. STREET.
RANDALL W. FLEMING.

Witnesses:
M. L. SULLIVAN,
KENNETT McC. DEWEESE.